Nov. 24, 1936.  H. E. CHAPMAN  2,061,958
AIR FILTERING APPLIANCE FOR BOTTLES
Filed Feb. 24, 1936   2 Sheets-Sheet 2
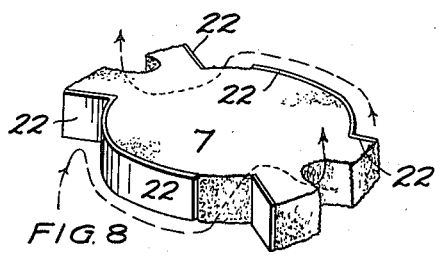
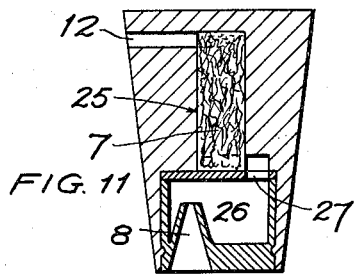
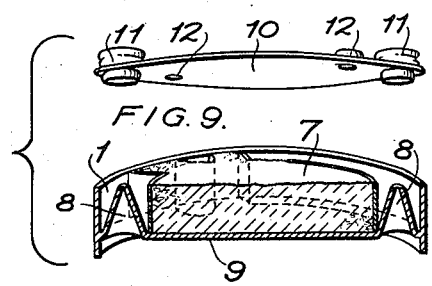
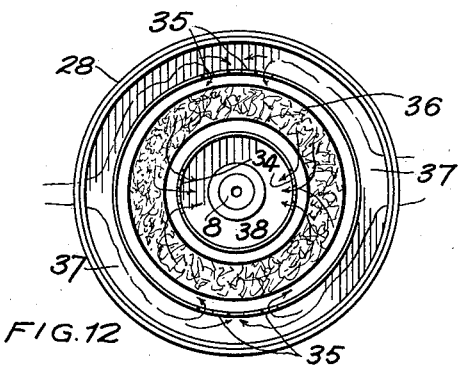
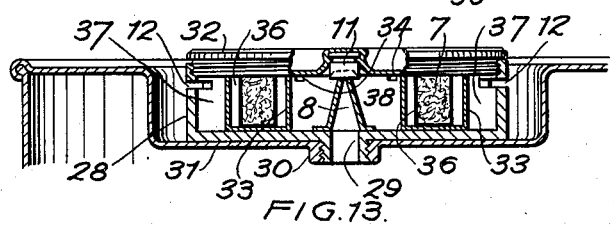
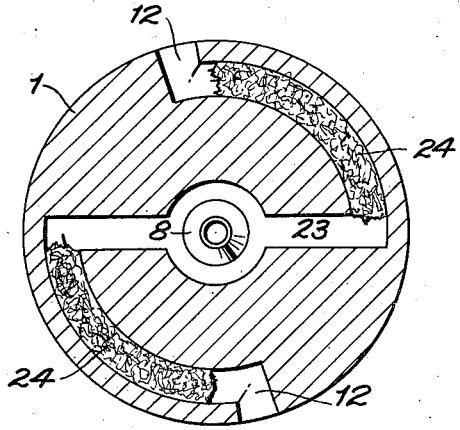
INVENTOR.
HAROLD E. CHAPMAN Patented Nov. 24, 1936

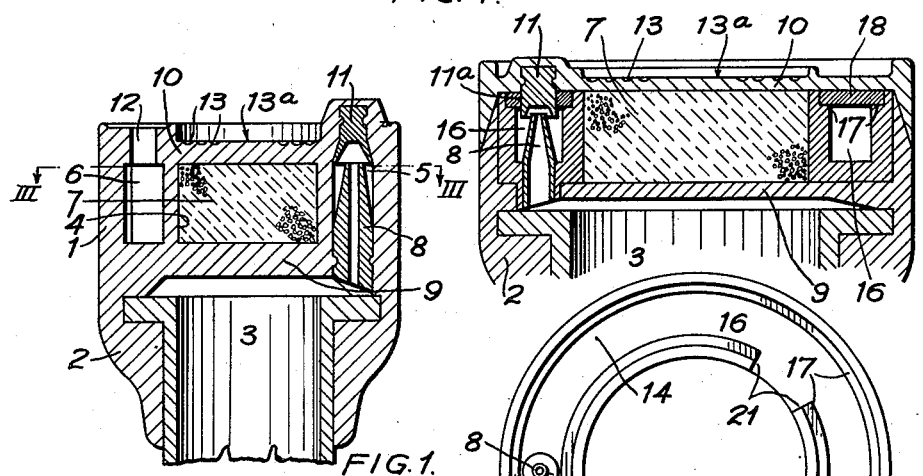
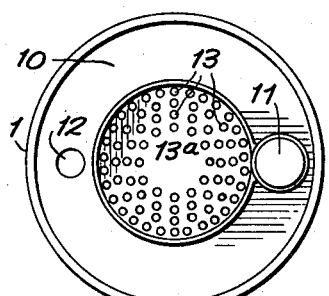
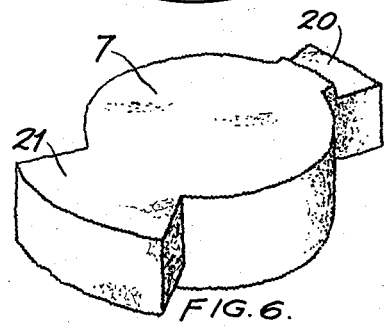
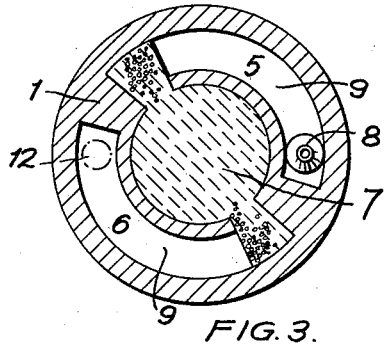
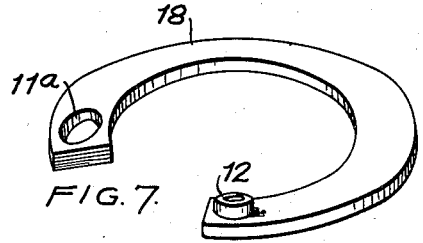
INVENTOR
HAROLD E. CHAPMAN

2,061,958

UNITED STATES PATENT OFFICE 2,061,958

AIR FILTERING APPLIANCE FOR BOTTLES

Harold Eric Chapman, Pinner, England

Application February 24, 1936, Serial No. 65,468
In Great Britain January 8, 1935

7 Claims. (Cl. 215—37)

This invention relates to air filtering appliances in the nature of caps or covers for use on bottles, flasks, canisters or other vessels for containing medicinal, food and like productions.

The present invention consists broadly of an air filtering appliance comprising a hollow main body portion which is shaped interiorly to provide a chamber in which a filtering medium is accommodated, the incoming or outgoing air being compelled by virtue of the shape of the chamber and/or the nature of the filtering medium to traverse between the inlet and outlet openings of the appliance a sinuous or tortuous path which is long compared with the overall dimensions of the appliance, to ensure lengthy subjection of the air to the filtering medium.

Although the filtering medium employed may itself be of such a nature as to "baffle" the flow of air, it is desirable in most cases to construct the chamber aforesaid in such a manner that the air is positively compelled to traverse a definite course for the greater part of its passage through the appliance.

The nature and arrangement of the filtering medium within the filter is such that the upper part of the mass of filtering material remains comparatively moisture-free, the tendency being for the moisture to collect at the bottom of the filter chamber. Consequently, air passing through the cap does not have to overcome the resistance of filtering material heavily loaded with moisture, so that the passage of the air is substantially unresisted, though tortuous, and the pressure of air within the bottle, flask or the like, is substantially the same as that surrounding atmosphere.

The invention is of special use with vessels adapted to contain liquids prepared for parenteral injection. Air filter caps in accordance with the present invention for use on vaccine, serum and hypodermic injection bottles permit of free ingress and egress of air to and from the bottle interior, via the filtering means provided, thus allowing a bottle to be filled with a non-sterile, thermo-stable liquid, capped and subsequently sterilized, or for a bottle to be capped and sterilized and subsequently filled with a sterile liquid. Moreover, it renders sterile the outer surface of a hollow needle passing through the cap by reason of the friction during piercing and of the bactericide contained in the part of the cap pierced. It also allows of the removal of the sterile contents with ease, the operations of filling and extraction being conducted, if need be, under the most adverse conditions without fear of contamination of the liquid. The filling and extraction operations in the case of filtering appliances for vaccine bottles and the like are effected by means of a filtering system or syringe terminating in a hypodermic needle which pierces through upper and lower puncturable walls or diaphragms.

The accompanying drawings illustrate various embodiments of the invention. In these drawings:

Figure 1 is a sectional elevation through a filter cap suitable for a vaccine bottle, Figure 2 is a plan view thereof, and Figure 3 is a sectional plan view on the line III, III Figure 1.

Figure 4 is a view similar to Figure 1 of an alternative construction of filter cap for bottles, containing bulk injections for intravenous use and Figures 5 and 6 and 7 are a plan view and pictorial views respectively of component parts of the filter hereinafter more particularly described.

Figure 8 is a pictorial view of a special filter pad hereinafter more particularly described, and Figure 9 is a view showing the main components of a filter in which this pad is employed.

Figure 10 is a sectional plan through a filter cap suitable for use on milk bottles.

Figure 11 is a sectional elevation of a filter made in the form of a cork, and

Figure 12 is a plan view of a filter of capsule form (with its lid removed) whilst Figure 13 is a sectional elevation of the filter capsule as employed on a canister.

In the vaccine-bottle filter shown in Figures 1 to 3 a moulded rubber body 1 is provided with a depending flexible skirt 2 which engages the bottle neck 3 and is formed interiorly with a central circular chamber 4 from which extend in opposite directions two symmetrically disposed curved ducts 5, 6, the openings from said chamber 4 to said ducts 5, 6 being diametrically opposite. A filter pad 7 is provided which fits snugly within the chamber 4 and extends into the openings of the ducts 5, 6. At the remote end of the duct 5 is a conical nozzle 8 which upstands from the floor 9 of the body 1 and affords a means of communication with the interior of the bottle. In the roof 10 of the body 1, immediately above the said nozzle 8, is embedded a closure plug 11, which by reason of the elasticity of the material forming the roof 10 can be depressed as and when required to close the passage of air through the nozzle 8. An air inlet hole 12 is also provided in the roof 10, situated above the remote end of the duct 6, so that air entering the bottle must necessarily traverse duct 6, through the filter pad 7 in the chamber 4, along the duct 5 and down through the nozzle 8. The ducts 5, 6 act as moisture traps.

The floor 9 and the roof 10 of the cap are in effect puncturable diaphragms through which a hypodermic needle may be pierced for filling a bottle or for extracting the contents thereof. A series of concentric rows of small depressions 13 being provided on the top face of the roof 10 to indicate suitable puncturing points for extraction purposes, the larger central zone 13a being reserved for filling purposes. The floor or diaphragm 9 is made of a rubber containing the minimum of aqueous soluble matter and must contain no dyes or pigments, (soluble in dilute acid or alkali within the range pH 3 to pH 9) or accelerators and anti-oxidants of an amine nature. The rubber should be filled with ceresin or other suitable waxy substance possessing little chemical affinity. The thickness of the floor 9 may be from 2½ to 5 mm., according to the size of the cap. The nozzle 8 and plug 11 may be made of ebonite, hard rubber or metal (such as aluminium) and the remainder of the cap, including the roof 10 is preferably composed of a tough, carbon-filled rubber, the roof being from 1 to 2 mm. in thickness according to the toughness. The filter pad 7 is preferably made of an anastomosing artificial sponge rubber containing a suitable bactericide and fungicide (e. g. dyes of the flavine series) and from 6 to 10 mm. thick. The bactericide and fungicide preferred consists of an aqueous solution of acriflavine (0.4 per cent). The bactericide and fungicide may be introduced into the filtering medium by soaking the medium in a suitable solution, drying and subsequently assembling the component parts of the cap, or by making the bactericidal agent into tablet form, inserting a tablet into the air inlet 12, and subsequently sterilizing the assembled bottle and cap by means of wet steam.

Preferably the roof 10 of the cap is troughed or dished as shown to hold a quantity of a suitable antiseptic liquid (e. g. 70% alcohol) which serves as a detergent for the upper surface of the roof and as a lubricant for the hypodermic needle.

In the modified vaccine-bottle filter shown in Figures 4 to 7, the body is in the form of a flat ring 14 with a central circular opening 15 and a C-shaped trough or duct 16, at one end of which the conical nozzle 8 is situated. A rebate or shoulder 17 is provided at the tops of the inner and outer trough walls to support a C-shaped trough cover 18 (see Figure 7). This cover 18 is provided with an air inlet 12, and with an opening 11a to enable a nozzle plug 11, embedded in the elastic roof 10, to be depressed onto the nozzle 8, as and when required. The filter pad 7, fits the central circular opening 15, and has a wedge-shaped head 21 to fit into the space corresponding to the mouth of the C-trough and a smaller wedge-shaped tail 20 which protrudes into the interior of the trough 16 through a gap 21 in its inner wall, the tail 20 constituting the effective part of the filter pad 7 through which air must pass before gaining access to the bottle interior. The roof 10, of the filter pad chamber is constituted by a separate, puncturable diaphragm, whilst the floor 9, is formed integrally with the sides of the cap and with the bottle-neck engaging skirt 2. The outer trough wall opposite to gap 21 may be cut away so that the pad 7 can be vulcanized to the cap side.

In the arrangement shown in Figures 8 and 9, the filter pad 7 is provided with walls 22, formed of skins or strips of rubber which are impervious to air and which function in the same way as the dividing walls between the filter pad chambers and the ducts or trough of the forms previously described. The roof 10 and the floor 9 may be of puncturable material (e. g. rubber) or of metal. If desired the walls 22, could be of metal, and either cemented to the rubber filter pad 7 or combined with the floor 9. In the construction shown two diametrically opposite nozzles 8 are employed and two diametrically opposite inlets 11. The path of the filtered air is indicated by arrows.

The construction of filters shown in Figure 10 is particularly suitable for use as a milk bottle cap, and consists of a body 1, having an S-shaped passage 23, therein, in the centre of which a conical nozzle 8, is located. Two plugs 24, of filtering material are interposed between the nozzle 8 and the two diametrically opposite air inlets 12. The filtering medium employed may be artificial sponge rubber, metal or glass fibres and the like.

A filter incorporated in a bottle stopper is shown in Figure 11, a filter plug 7 of any suitable material being accommodated with the bore 25 of the stopper. An air inlet 12, is provided at the top of the stopper and a water-trap 26, containing a nozzle 8, is inserted in the base of the stopper, communication between the filter bore 25, and the trap 26, being established through the opening 27. Moisture and air-impervious skins may be provided on the upper and lower ends of plug 7 if desired.

A filter device especially suitable for use on canisters and other comparatively large vessels is illustrated in Figures 12 and 13 and is in the form of a capsule, comprising a dish-like body 28 with a depending screwed nipple 29, for engagement with a hollow screwed socket 30, provided in the floor of a recess 31, in the top of the canister. The body 28, is provided with a screw cap 32, the floor of which may be flexible so as to permit of deflection to enable a closure plug 11, carried thereby, to close the nozzle 8. In the upper part of the wall of said body 28, a series of air inlets 12, are formed. A conical nozzle 8, communicating with the interior of the canister via the nipple 29, and socket 30, is disposed centrally within the capsule, and concentrically arranged around said nozzle 8, is an imperforate ring-like trough 33, having gaps or castellations 34, 35 in the inner and outer wall edges thereof to permit of the passage of air. Within the trough 33, is accommodated a ring-like cage 36, having perforated walls and housing the filtering media 7. The air inlets 12, are preferably situated within a diametrical zone which is at right angles to the diametrical zone in which the gaps or castellations 35, in the outer wall of the trough 33, are situated, so as to compel the air to pass along the outer annular space 37, formed between the capsule wall and the trough 33. Similarly the trough-wall gaps 34, are disposed at right angles to the gaps 35, thereby compelling the air to pass through, instead of simply across, the filtering medium 7. A sinuous or tortuous air path is thus provided between the inlets 12 and nozzle 8. The annular space 38, at the centre of the capsule and the space 37, between the capsule wall and the trough 33, constitute moisture traps. The whole of the capsule may be made of a suitable metal, whilst the filtering media may be of any of the forms previously described.

I claim:—

1. A container closure having a substantially horizontally disposed passageway and an opening providing communication between said passageway and the atmosphere, a member disalined from said opening and extending upwardly into said passageway from the bottom thereof and having a duct providing communication between said passageway and the container, said duct opening into said passageway above the bottom thereof, and an air filtering medium in said passageway.

2. A container closure comprising a body of puncturable material having therein a chamber containing a means to sterilize a needle passed therethrough, said body having a substantially horizontally disposed passageway outwardly of said chamber providing communication between the atmosphere and the container, said passageway being formed to provide a trap to capture liquid carried by air flowing into or from the container through said passageway, a part of the needle sterilizing means extending from said chamber into said passageway and being effective to filter air flowing through said passageway.

3. A container closure as set forth in claim 2 in which the passageway is comprised in part by the chamber and in which communication between said passageway and the atmosphere is to one side of said chamber and communication between said passageway and the container is to the other side of said chamber so that air flowing between the atmosphere and the container is required to pass through the sterilizing means contained in said chamber.

4. A container closure comprising a body of puncturable material having therein a substantially horizontally disposed, substantially S-shaped passageway, said passageway being medially enlarged to form a chamber disposed substantially centrally of the closure, said closure having an opening providing communication between the atmosphere and said passageway to one side of said chamber, a member extending upwardly into said passageway from the bottom thereof to the other side of said chamber, said member having a duct providing communication between the container and said passageway, said duct opening into said passageway above the bottom thereof, and air filtering and needle sterilizing means in said chamber.

5. A container closure as set forth in claim 2 in which the top of the closure is formed with a cup overlying the chamber.

6. A container closure as set forth in claim 4 in which the top of the closure is formed with a cup overlying the chamber.

7. A container closure as set forth in claim 1 in which the closure wall above the passageway is elastic and carries a plug to close the upper end of the duct in the member by depression of said wall.

HAROLD ERIC CHAPMAN.